United States Patent [19]

Hachiya et al.

[11] Patent Number: 5,792,387
[45] Date of Patent: Aug. 11, 1998

[54] LIQUID CRYSTAL COMPOSITION AND LIQUID CRYSTAL DISPLAY ELEMENT

[75] Inventors: Norihisa Hachiya; Katsuyuki Murashiro; Tetsuya Matsushita; Fusayuki Takeshita; Etsuo Nakagawa, all of Chibaken, Japan

[73] Assignee: Chisso Corporation, Osaka-fu, Japan

[21] Appl. No.: 753,679

[22] Filed: Nov. 27, 1996

[30] Foreign Application Priority Data

Nov. 30, 1995 [JP] Japan .................. 7-335783

[51] Int. Cl.$^6$ .................. C09K 19/06; C09K 19/52; C09K 19/30; C09K 19/12
[52] U.S. Cl. .................. 252/299.6; 252/299.01; 252/299.63; 252/299.66
[58] Field of Search .................. 252/299.6, 299.01, 252/299.63, 299.66

[56] References Cited

U.S. PATENT DOCUMENTS

| | | | |
|---|---|---|---|
| 5,250,216 | 10/1993 | Goto et al. | 252/299.6 |
| 5,314,640 | 5/1994 | Yamada | 252/299.6 |
| 5,356,558 | 10/1994 | Yamada et al. | 252/299.01 |
| 5,437,815 | 8/1995 | Yamada et al. | 252/299.66 |
| 5,447,657 | 9/1995 | Schadt et al. | 252/299.01 |
| 5,453,864 | 9/1995 | Yamada et al. | 359/103 |

*Primary Examiner*—C. H. Kelly
*Attorney, Agent, or Firm*—Wenderoth, Lind & Ponack, L.L.P.

[57] ABSTRACT

A liquid crystal composition comprising, for example, a first component of the formula (1-2), a second component of the formula (2-a) and a third component of the formulas (3) and (4), the respective contents being 3 to 30%, 10 to 60% and 20 to 80%, each by weight,

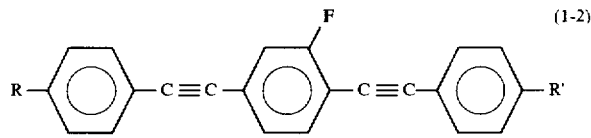

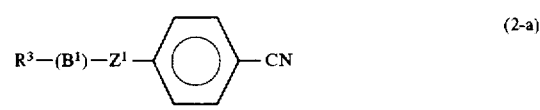

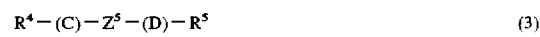

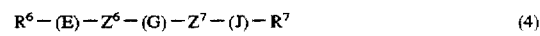

wherein R, $R^1$, $R^3$, $R^4$, $R^5$ and $R^6$ each independently represent an alkyl group of $C_{1-10}$ or an alkenyl group of $C_{2-10}$; $R^7$ represents an alkyl group, an alkenyl group or an alkoxymethyl group of $C_{1-10}$; $B^1$, C, D and J represent 1,4-cyclohexylene or 1,4-phenylene; E represents 1,4-cyclohexylene or pyrimidine-2,5-diyl; G represents 1,4-cyclohexylene or 1,4-phenylene wherein H at the lateral positions may be replaced by F; $Z^1$ and $Z^6$ represent —COO—, —$C_2H_4$— or a single bond; and $Z^5$ and $Z^7$ represent —C—C— or a single bond.

8 Claims, 1 Drawing Sheet

F I G. 1
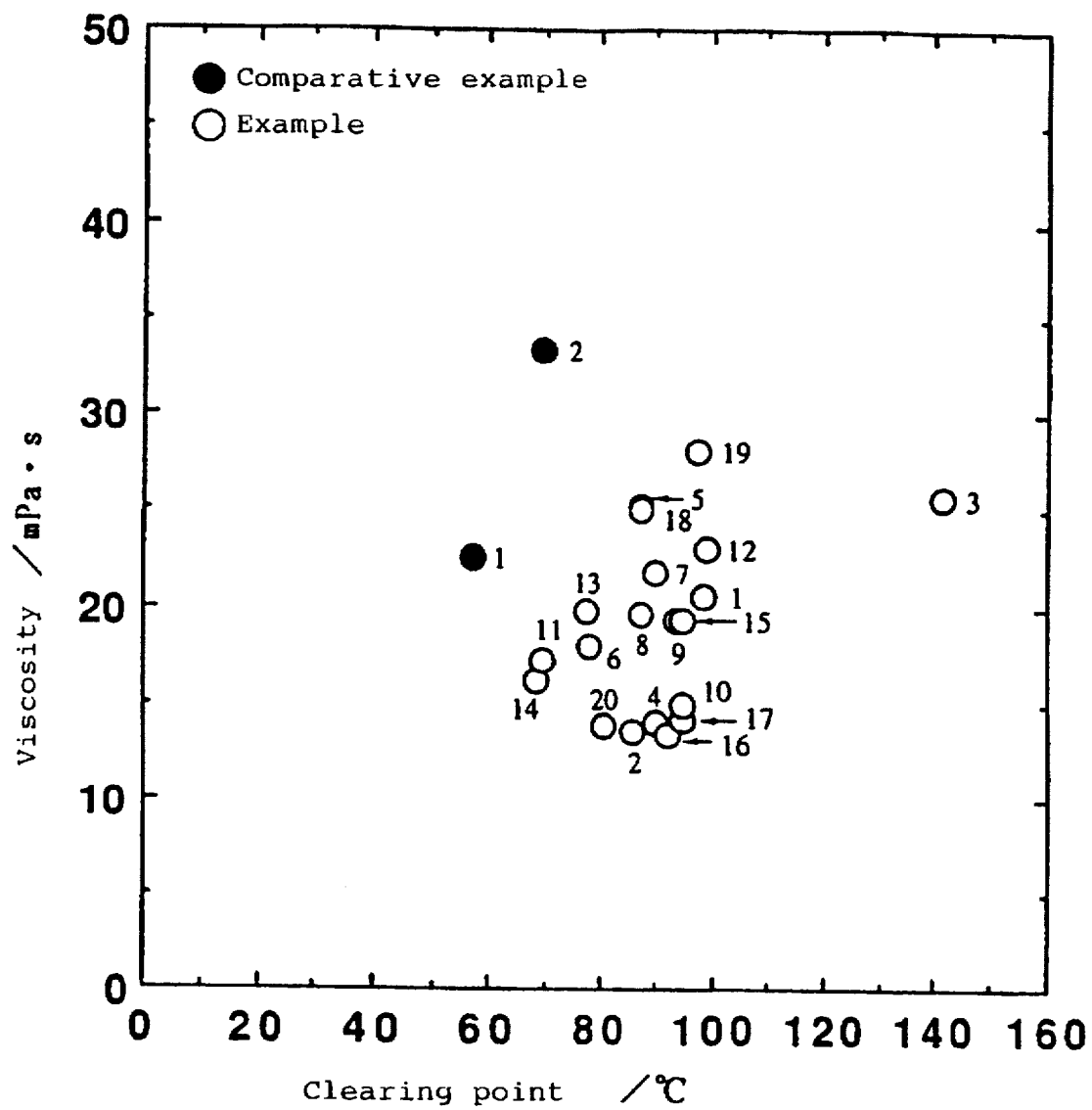

LIQUID CRYSTAL COMPOSITION AND LIQUID CRYSTAL DISPLAY ELEMENT

BACKGROUND OF THE INVENTION

1. Field of the Invention

This invention relates to a liquid crystal composition and a liquid crystal display element using the same.

More in detail, it relates to a liquid crystal composition used for the display element of twisted nematic (TN) mode or super twisted nematic (STN) mode and to a liquid crystal display element using the liquid crystal composition.

2. Description of the Related Art

As the display mode of the liquid crystal display element (LCD) of electric field effect type, twisted nematic (TN) mode, super twisted nematic (STN) mode, active matrix (AM-LCD) mode, etc. have been proposed and successively practically used.

For the liquid crystal composition used as the liquid crystal display element of TN and STN modes among the above modes, the following characteristics (1) to (5) are required in common thereto:

(1) a nematic liquid crystal phase is exhibited within a broad temperature range including room temperature;
(2) the threshold voltage is low in order to reduce electric consumption;
(3) the viscosity ($\eta$) is low in order to make the response time ($\tau$) as short as possible;
(4) an adequate refractive anisotropy value ($\Delta n$) corresponding to the liquid crystal display element can be employed; and
(5) chemical stability.

In recent years, countermeasure to the moving image of LCD has been earnestly required, and the respective LCD display modes have been variously researched. For example, in the TN display mode wherein the alignment of liquid crystal molecules between the upper and lower substrates is twisted by 90°, G. Bauer discloses in Cryst. Liq., 63, 45 (1981) that in order to prevent occurrence of infringence stripes on the cell surface, it is necessary to establish the product $\Delta n \cdot d$ (µm), that is, the product of optical anisotropy value ($\Delta n$) of the liquid crystal material filled in the cell and the cell thickness (d) µm, to a definite value (e.g. $\Delta n \cdot d = 0.5$, $\Delta n \cdot d = 1.0$, etc.). In this case, when a liquid crystal material having large $\Delta n$ value is used, it is possible to make the d value less. The electo-optical response time ($\tau$) of the liquid crystal element is proportional to the viscosity ($\eta$) of the liquid crystal material, and also proportional to the square of the cell thickness; hence when d becomes small, $\tau$ lowers notably. Thus, for the liquid crystal composition used for such liquid crystal display element, it is very useful for the liquid crystal composition to have a high $\Delta n$ and a low viscosity.

On the other hand, in the super twisted display mode (STN) proposed by T. J. Scheffer et al (Appl. Phys. Lett., 45 (10), 1021 (1984)), wherein the alignment of liquid crystals between the upper and lower substrates is twisted by an angle of 180° to 270°, the interference color due to birefringence effect is particularly used for the mode. Therefore the light path length ($\Delta n \cdot d$) of the birefringence is adjusted to a definite value (e.g. $\Delta n \cdot d = 0.85$, etc.). Thus, when a liquid crystal material has a large $\Delta n$, the response time ($\tau$) notably lowers, as described above. Thus, it is also very useful that the liquid crystal composition used in the STN display mode should have a high $\Delta n$.

Further, particularly in the use applications of active addressing (MLS) display mode, reflection type color STN display mode, etc., a liquid crystal composition having a large $\Delta n$ value (e.g. $\Delta n \geq 0.18$) is required.

Further, with increase of the portable type display, development of a display element aiming at outdoor use has also been researched. In order to endure the outdoor use, it is required to exhibit nematic phase over the region exceeding the temperature of use environment. From such a viewpoint, an element having a nematic-isotropic phase transition point (clearing point: $T_{NI}$) of the liquid crystal composition of 60° C. or higher and a lower limit temperature of the nematic phase ($T_L$) (smectic-nematic phase transition point ($T_{SN}$) or crystalline-nematic phase transition point ($T_{CN}$)) of −20° C. or lower is mainly used.

Japanese patent application laid-open No. Hei 6-316541, Japanese patent application laid-open No. Hei 2-83340 and Japanese patent application laid-open No. Hei 1-305040, for example, disclose a liquid crystal composition containing the compound expressed by the formula (1) of the present invention. However, none of these publications include a description directed to low temperature compatibility (broad nematic range) which is one of the problems to be solved by the present invention.

Further, the above Japanese patent application laid-open No. Hei 1-305040 discloses a mixture of the compound of the formula (1) of the present invention with a cyanophenylcyclohexane group mixture, but it has no disclosure directed to the constituting components of the liquid crystal composition and the mixing ratio thereof required for exhibiting the characteristics of the liquid crystal material.

As described above, liquid crystal compositions have been strenuously researched in accordance with various objects, but it is the present status that improvement has always been required.

SUMMARY OF THE INVENTION

The object of the present invention is to provide a liquid crystal composition which satisfies various characteristics sought in the above TN-LCD display mode and STN-LCD display mode and at the same time, has particularly a high optical anisotropy, a superior low temperature compatibility, a broad range of nematic phase and a low viscosity.

The present invention will be described in detail.

The first feature of the present invention is as follows:

(1) A liquid crystal composition containing as a first component, at least one member of compounds expressed by the formula (1)

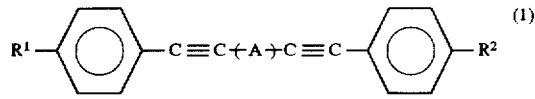

wherein $R^1$ and $R^2$ each independently represent an alkyl group of 1 to 10 carbon atoms or an alkenyl group of 2 to 10 carbon atoms, and in any of the groups, optional one or two not-adjacent methylene groups may be replaced by oxygen atom; and A represents 1,4-phenylene whose one H on lateral positions thereof may be replaced by F;

as a second component, at least one member selected from the groups of compounds expressed by the formulas (2-a), (2-b), (2-c), (2-d) or (2-e):

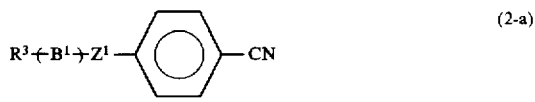

-continued

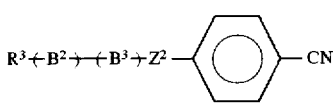
(2-b)

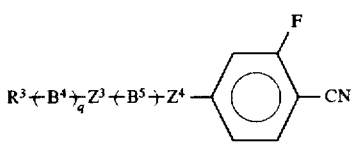
(2-c)

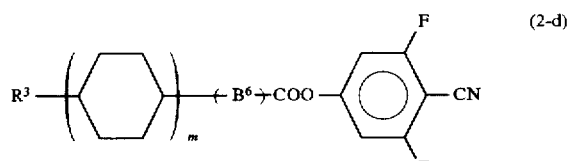
(2-d)

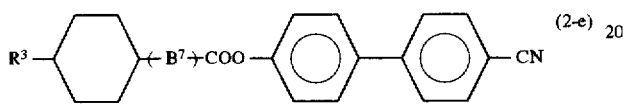
(2-e)

wherein $R^3$ represents an alkyl group of 1 to 10 carbon atoms or an alkenyl group of 2 to 10 carbon atoms, and in any of the groups, an optional one or two not-adjacent methylene groups may be replaced by oxygen atom; $Z^1$ and $Z^4$ each independently represent —COO—, —$C_2H_4$— or a single bond; $Z^2$ and $Z^3$ each independently represent —$C_2H_4$— or a single bond; $B^1$ represents trans-1,4-cyclohexylene, 1,4-phenylene or 1,3-dioxane-trans-2,5-diyl; $B^2$, $B^3$, $B^4$, $B^6$ and $B^7$ each independently represent trans-1,4-cyclohexylene or 1,4-phenylene; and $B^5$ represents trans-1,4-cyclohexylene or 1,4-phenylene wherein one H on lateral positions thereof may be replaced by F; and q and m each independently represent 0 or 1;

and as a third component, at least one member selected from groups of compounds expressed by the formulas (3), (4) or (5):

(3)

(4)

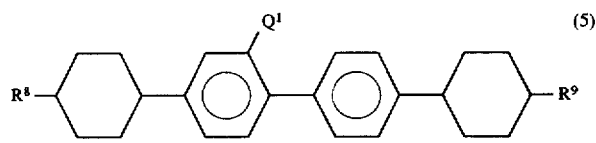
(5)

wherein $R^4$, $R^5$, $R^6$ and $R^8$ each independently represent an alkyl group of 1 to 10 carbon atoms or an alkenyl group of 2 to 10 carbon atoms, and in any of the groups, optional one or two not-adjacent methylene groups may be replaced by oxygen atom; $R^7$ and $R^9$ each independently represent an alkyl group, an alkoxy group or an alkoxymethyl group, each of 1 to 10 carbon atoms; C represents trans-1,4-cyclohexylene, pyrimidine-2,5-diyl or 1,4-phenylene; D and J each represent trans-1,4-cyclohexylene or 1,4-phenylene; E represents trans-1,4-cyclohexylene or pyrimidine-2,5-diyl; G represents trans-1,4-cyclohexylene or 1,4-phenylene wherein one H on lateral positions thereof may be replaced by F; $Z^5$ represents —C≡C—, —$C_2H_4$—, —CH=CH— or a single bond; $Z^6$ represents —$C_2H_4$—, —COO— or a single bond; $Z^7$ represents —C≡C—, —COO—, —CH=CH— or a single bond; and $Q^1$ represents H or F.

The other features of the present invention are as follows:

(2) A liquid crystal composition according to item (1), wherein the mixing ratios of the first component, the second component and the third component are respectively 3 to 30%, 10 to 60% and 20 to 80%, each based upon the total weight of the liquid crystal composition.

(3) A liquid crystal composition according to items (1) or (2), wherein there is further contained as a fourth component, at least one member of compounds selected from groups of compounds expressed by the formulas (6) or (7):

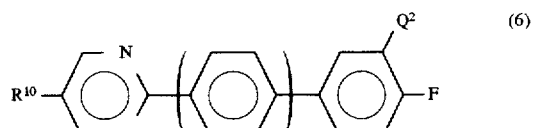
(6)

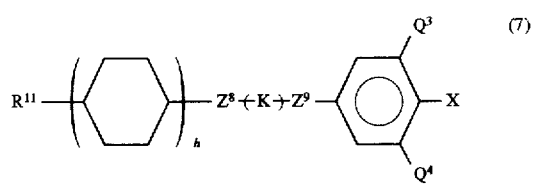
(7)

wherein $R^{10}$ and $R^{11}$ each independently represent an alkyl group of 1 to 10 carbon atoms; K represents trans-1,4-cyclohexylene or 1,4-phenylene; $Z^8$ and $Z^9$ each independently represent —COO—, —$C_2H_4$— or a single bond; X represents F or Cl; $Q^2$, $Q^3$ and $Q^4$ each independently represent H or F; k represents 0 or 1; and h represents 0, 1 or 2.

(4) A liquid crystal composition according to item (3), wherein the mixing ratio of the fourth component is 40% or less based upon the total weight of the liquid crystal composition.

The second feature of the present invention is a liquid crystal display element using a liquid crystal composition according to any one of the above items (1) to (4).

BRIEF DESCRIPTION OF THE DRAWING

FIG. 1 shows the correlation between the clearing point and the viscosity in the compositions of Examples and Comparative examples.

EXPLANATION OF SYMBOLS

●: Comparative examples (the suffixes denote numbers of Comparative examples).

○: Examples (the suffixes denote numbers of Examples).

DETAILED DESCRIPTION OF PREFERRED EMBODIMENTS

The liquid crystal compounds constituting the liquid crystal compositions of the present invention will be described below.

As preferable compounds expressed by the formula (1), as the first component of the present invention, the following compounds can be mentioned:

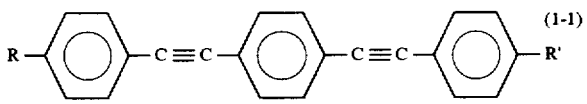
(1-1)

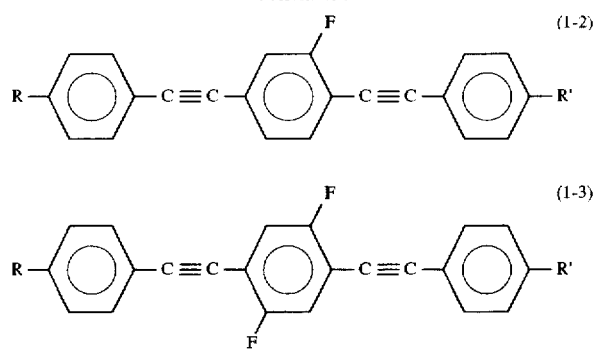

In the above formulas, R and $R^1$ represent an alkyl group or an alkenyl group.

Among these compounds, those expressed by the formulas (1-1) or (1-2) are particularly preferably used in the present invention. The compound of the formula (1) has a high optical anisotropy ($\Delta n$) and a comparatively high clearing point; hence it is used for adjusting the $\Delta n$ value of the resulting composition and also for broadening the nematic range thereof.

As the compound expressed by the formulas (2-a), (2-b), (2-c), (2-d) or (2-e), and used as the second component of the present invention, compounds expressed by the following formulas are preferably used:

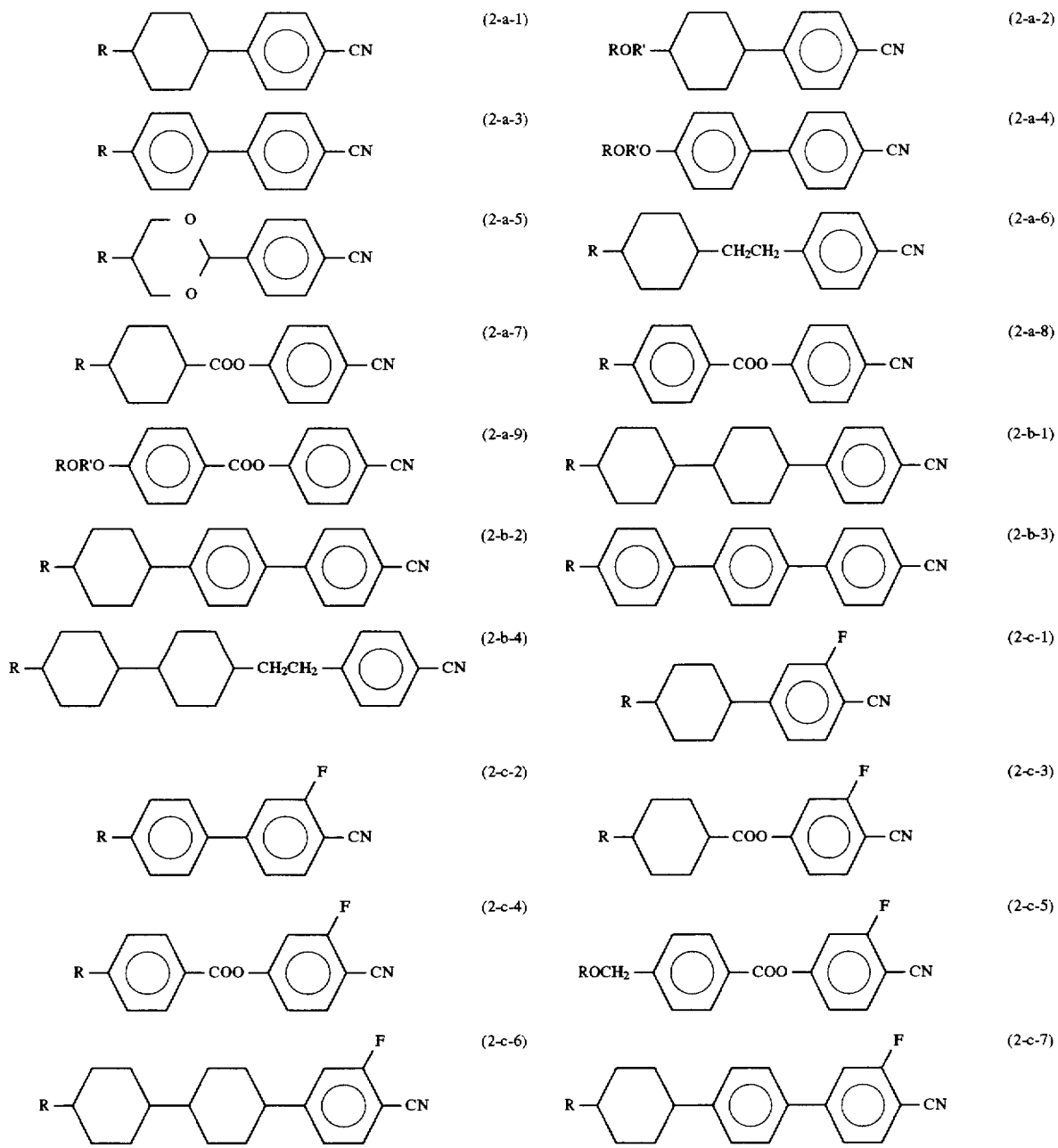

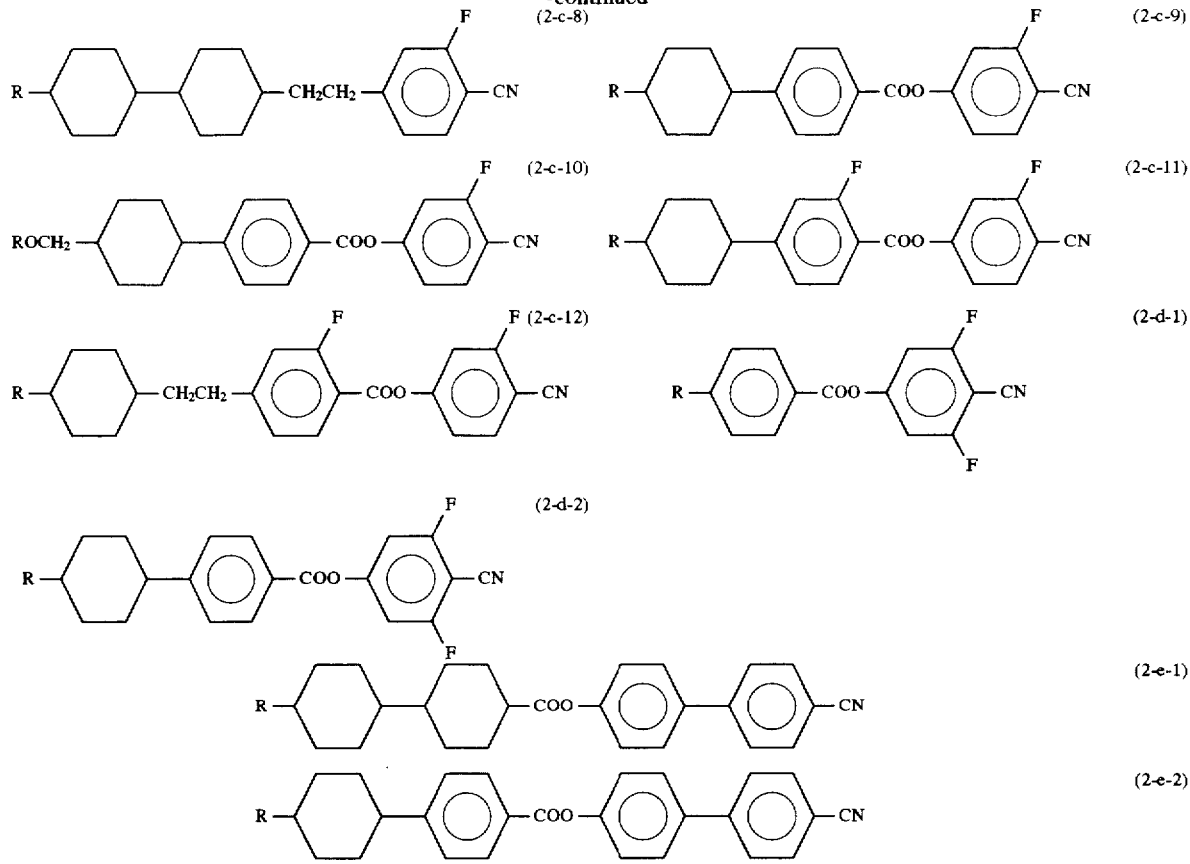

In these formulas, R represents an alkyl group or an alkenyl group, and $R^1$ represents an alkanediyl group or an alkenediyl group.

Among these compounds, those expressed by the formulas (2-a-1), (2-a-2), (2-a-3), (2-a-4), (2-a-5), (2-a-8), (2-b-1), (2-b-2), (2-b-3), (2-c-1), (2-c-4), (2-c-5), (2-c-6), (2-c-9), (2-c-10), (2-c-11), (2-d-1), (2-d-2), (2-e-1) or (2-e-2) are particularly preferably used in the present invention.

These compounds of the second component exhibit a large positive dielectric anisotropy value ($\Delta\epsilon$), and are mainly used for reducing the threshold voltage of the resulting composition, and further for improving the steepness of transmittance-impressed voltage curve which is important in the STN mode.

As preferable compounds expressed by the formulas (3), (4) and (5), as the third component, the following compounds can be mentioned.

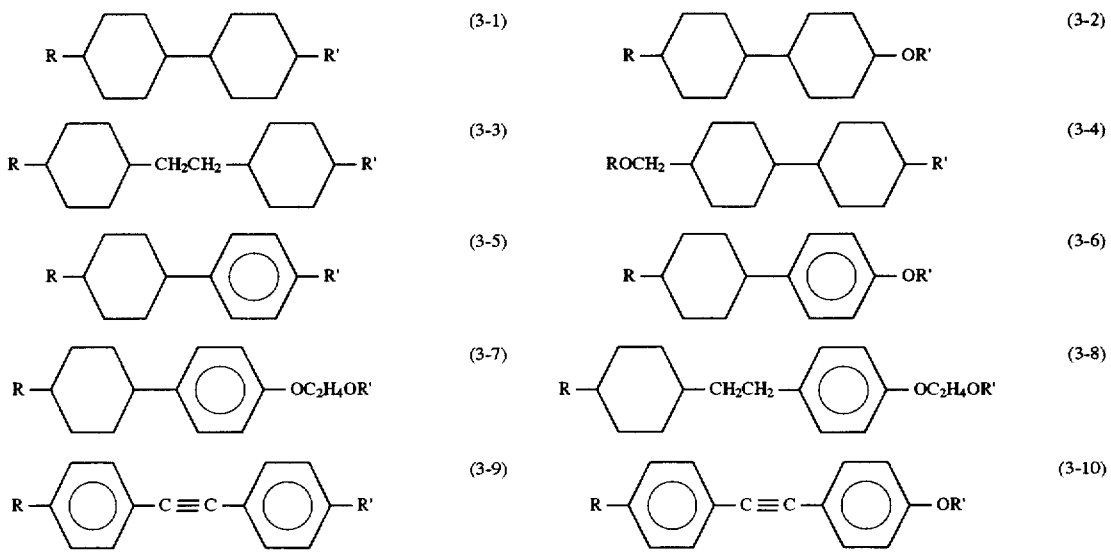

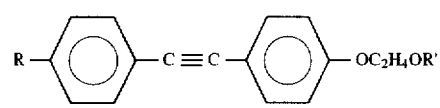 (3-11)
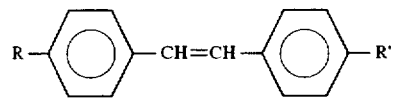 (3-12)
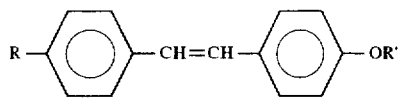 (3-13)
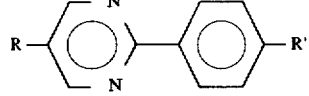 (3-14)
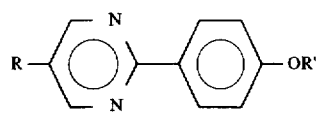 (3-15)
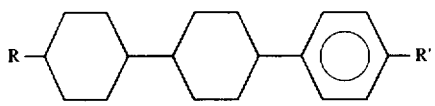 (4-1)
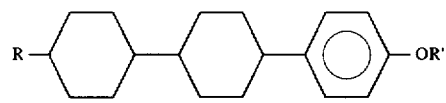 (4-2)
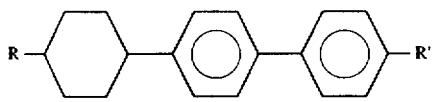 (4-3)
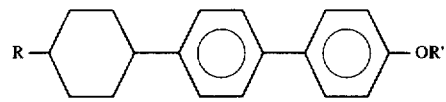 (4-4)
 (4-5)
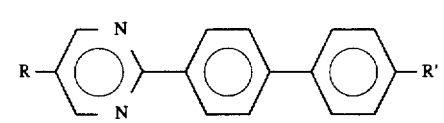 (4-6)
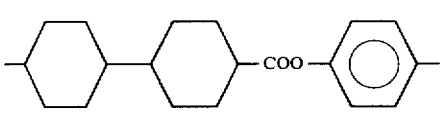 (4-7)
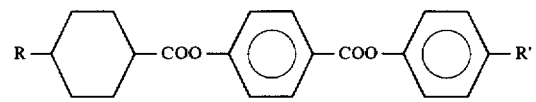 (4-8)
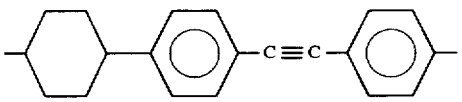 (4-9)
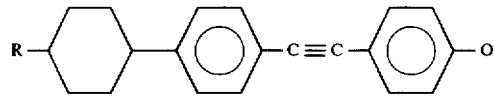 (4-10)
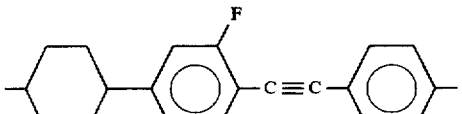 (4-11)
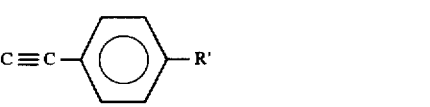 (4-12)
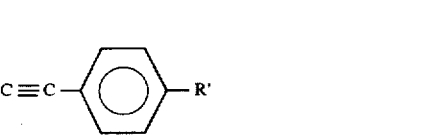 (4-13)
 (4-14)
 (4-15)
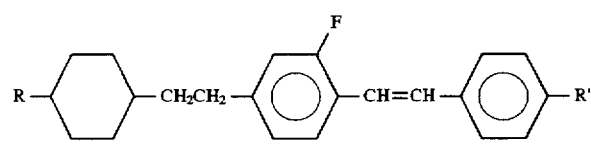 (4-16)

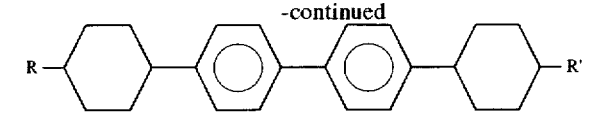 (5-1)

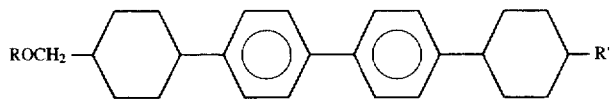 (5-2)

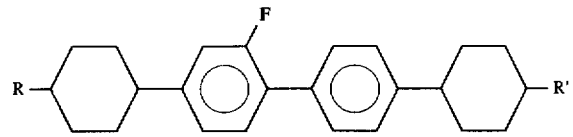 (5-3)

In these formulas, R and $R^1$ each independently represent an alkyl group or an alkenyl group.

Among these compounds, as compounds expressed by the formula (3), those expressed by the formulas (3-1), (3-2), (3-4), (3-5), (3-6), (3-9), (3-10), (3-14) or (3-15) are particularly preferably used in the present invention. Further, as compounds expressed by the formula (4), those expressed by the formulas (4-1), (4-2), (4-3), (4-5), (4-6), (4-8), (4-9), (4-11), (4-12), (4-14) or (4-15) are particularly preferably used in the present invention. Furthermore, as compounds expressed by the formula (5), those expressed by the formulas (5-2) or (5-3) are particularly preferably used in the present invention.

Compounds of the formulas (3), (4) and (5) as the third component exhibit a dielectric anisotropy of a negative value or small positive value. The compound of the formula (3) is used mainly for reducing the viscosity of the resulting composition and/or for adjusting the Δn value thereof. The compound of the formula (4) is used for broadening the nematic range of the resulting composition, for adjusting the Δn value thereof and/or for adjusting the viscosity thereof.

Further, the compound of the formula (5) is used for broadening the nematic range of the resulting composition and/or for adjusting the Δn value thereof.

As compounds of the formulas (6) and (7) of the fourth component, the compounds of the following formula are preferably used:

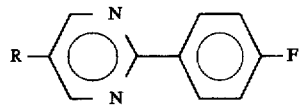 (6-1)

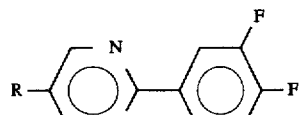 (6-2)

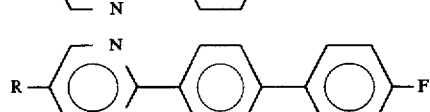 (6-3)

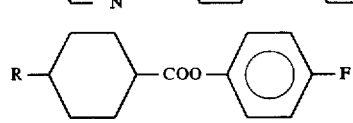 (7-1)

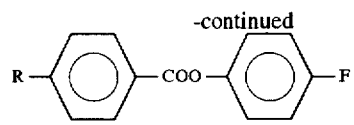 (7-2)

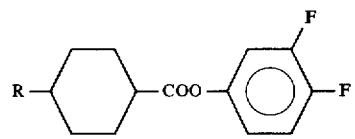 (7-3)

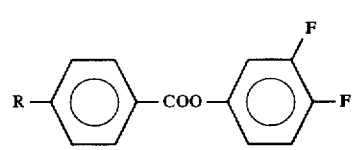 (7-4)

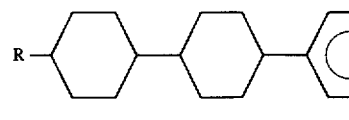 (7-5)

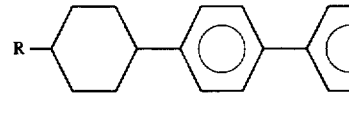 (7-6)

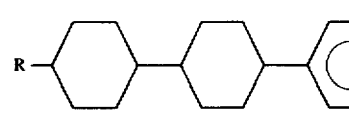 (7-7)

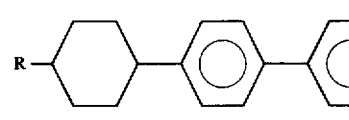 (7-8)

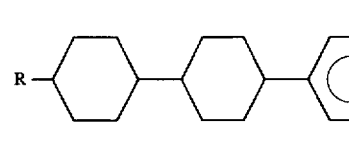 (7-9)

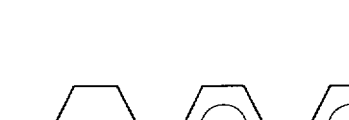 (7-10)

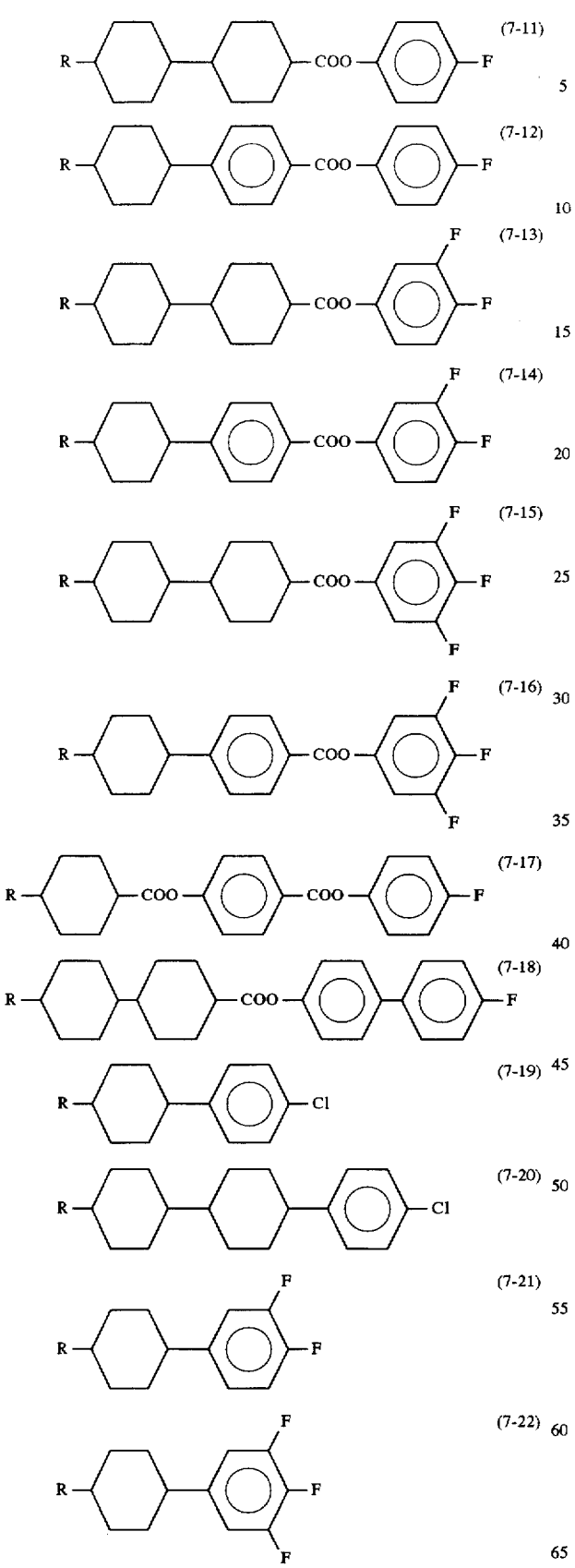
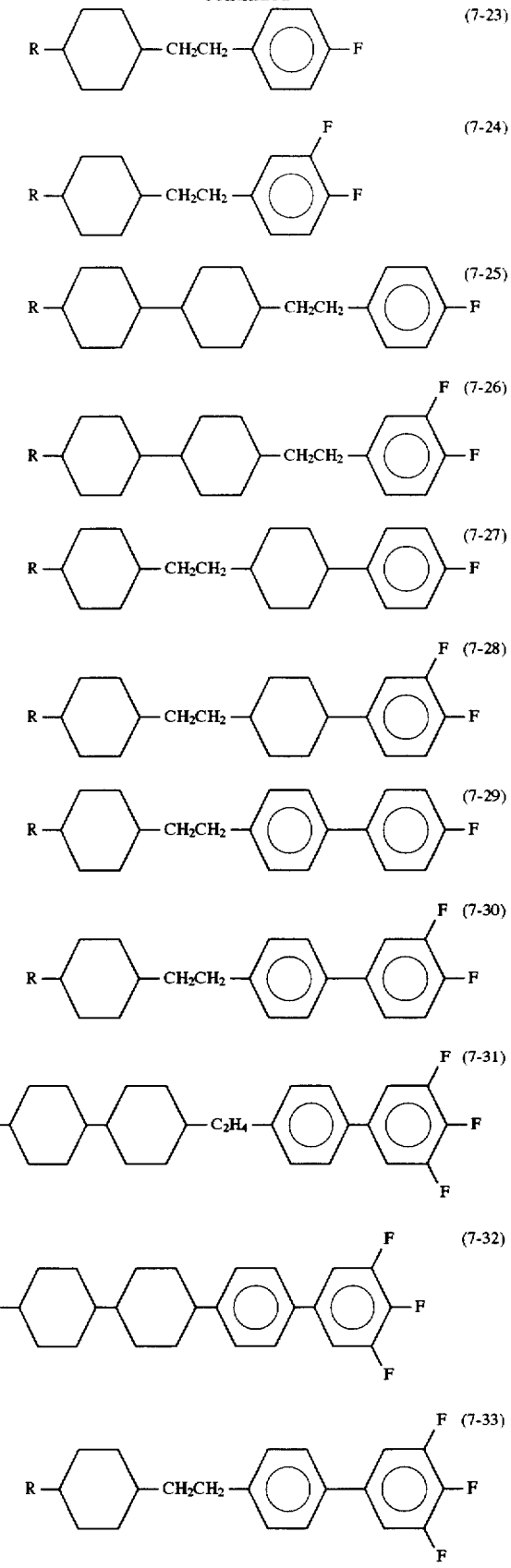

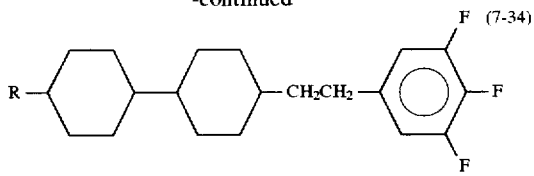

In the above formulas, R represents an alkyl group.

As the compounds expressed by the formula (6), those expressed by the formulas (6-1), (6-2) or (6-3) are particularly preferably used in the present invention. Further, as the compounds expressed by the formula (7), those expressed by the following formulas (7-1), (7-5), (7-6), (7-7), (7-8), (7-9), (7-10), (7-11), (7-12), (7-13), (7-14), (7-15), (7-16), (7-17), (7-18), (7-19), (7-20), (7-21), (7-22), (7-24), (7-28), (7-31), (7-32), (7-33) or (7-34) are particularly preferably used in the present invention.

Compounds expressed by the formulas (6) and (7) have a positive dielectric anisotropy value, and are used particularly for reducing the threshold voltage of the resulting composition and also for improving the temperature-dependency of the threshold voltage. Further, they can be also used for adjusting the viscosity of the resulting composition, or for adjusting its Δn, and/or for broadening the nematic range by elevating its clearing point.

The mixing ratio of the first component in the liquid crystal composition of the present invention is preferably 3 to 30% by weight based upon the total weight of the liquid crystal composition, and more preferably 3 to 25% by weight, and further more preferably 5 to 25% by weight. If the mixing ratio of the first component is less than 3% by weight, it is difficult to obtain a composition having a high Δn value, as one object of the present invention, while if the mixing ratio exceeds 30% by weight, the compatibility at low temperature of the composition may become inferior. Namely, in such a case, solids may deposit or smectic phase may appear at low temperature; hence the object of the present invention may not be achieved.

The mixing ratio of the second component is preferably 10 to 60% based upon the weight of the resulting composition, and more preferably 10 to 50% by weight and further more preferably 15 to 50% by weight. If the mixing ratio of the second component is less than 10% by weight, the threshold voltage of the resulting liquid crystal composition may become high. Further, if the mixing ratio exceeds 60% by weight, the Δn value of the resulting liquid crystal composition may not be increased or the viscosity may not be lowered.

The mixing ratio of the third component is preferably 20 to 80% based upon the total weight of the composition, and more preferably 25 to 75%, and further more preferably 35 to 71% by weight. If the mixing ratio is less than 20% by weight, a low viscosity composition may not be obtained, while if it exceeds 80% by weight, the threshold voltage of the composition may become high.

When the fourth component is used in the present invention, the mixing ratio is preferably 40% or less based upon the total weight of the resulting composition, and more preferably 35% by weight or less.

It is possible for the liquid crystal composition of the present invention to further contain compounds besides those expressed by the above formulas (1) to (7), in suitable quantities within a range which does not harm the object of the present invention, in order to adjust the threshold voltage, nematic range, Δn, dielectric anisotropy, viscosity, etc. of the resulting composition, and in accordance with the objects of use of the liquid crystal display element.

The liquid crystal composition used in accordance of the present invention can be prepared according to a process which is conventional by itself. In general, there is employed a process of dissolving various components with each other, at a high temperature to obtain a uniform mixture.

Further, by adding a suitable compound to the liquid crystal composition of the present invention, it is possible to prepare a liquid crystal material suitable to use applications. Such an additive has been well known to persons of skill in the art, and has been described in literatures, etc. in detail. Usually, a chiral dopant for inducing a helical structure of liquid crystals to thereby adjust a necessary twist angle and prevent the reverse twist, or the like, may be added.

Further, it is also possible to add to the liquid crystal composition, a dichroic pigment such as those of mellocyanine group, styryl group, azo group, azomethine group, azoxy group, quinophthalone group, anthraqninone group, tetrazine group, etc., to thereby obtain a liquid crystal composition for guest-host (GH) mode. Further, it is possible to use the liquid crystal composition of the present invention, for polymer-dispersion type liquid crystal display element (PNLCD) represented by NCAP prepared by microencapsulating nematic liquid crystals, or polymer dispersion type liquid crystal display element (PDLCD) prepared by forming three-dimensional a polymer network in liquid crystals. Besides, it is possible to use the composition of the present invention as liquid crystal materials for electrically controlled birefringence (ECB) mode or dynamic scattering (DS) mode.

The preferable embodiments of the present invention are shown in the following (i), (ii), (iii) and (iv):

(i) A liquid crystal composition containing as a first component, at least one member of compounds expressed by the above formulas (1-1) or (1-2); as a second component, at least one member of compounds expressed by the above formulas (2-a-1), (2-a-2), (2-a-3), (2-a-5), (2-a-8), (2-b-1), (2-b-2), (2-c-1), (2-c-5), (2-c-6), (2-c-9), (2-c-11), (2-d-1), (2-d-2), (2-e-1) or (2-e-2); and as a third component, at least one member of compounds expressed by the above formulas (3-1), (3-2), (3-4), (3-6), (3-9), (3-10), (3-14), (3-15), (4-1), (4-2), (4-3), (4-5), (4-6), (4-8), (4-11), (4-12), (4-14) or (5-2), in mixing ratio of 5 to 25% of the first component, 15 to 50% of the second component and 25 to 75% of the third component based upon the total weight of the composition.

(ii) A liquid crystal composition wherein, in the above composition (i), the respective mixing ratios of the first component, the second component and the third component are 5 to 21%, 19 to 50% and 35 to 71%, based upon the total weight of the composition.

(iii) A liquid crystal composition containing as a first component, at least one member of compounds expressed by the above formulas (1-1) or (1-2); as a second component, at least one member of compounds expressed by the above formulas (2-a-1), (2-a-2), (2-a-3), (2-a-5), (2-a-8), (2-b-1), (2-b-2), (2-c-1), (2-c-5), (2-c-6), (2-c-9), (2-c-11), (2-d-1), (2-d-2), (2-e-1) or (2-e-2); as a third component, at least one member of compounds expressed by the above formulas (3-1), (3-2), (3-4), (3-6), (3-9), (3-10), (3-14), (3-15), (4-1), (4-2), (4-3), (4-5), (4-6), (4-8), (4-11), (4-12), (4-14) or (5-2); and as a fourth component, at least one member of compounds expressed by the above formulas (6-1), (6-2), (6-3), (7-5), (7-6), (7-7), (7-8), (7-10), (7-11), (7-12), (7-19), (7-20), (7-21), (7-24), (7-28), (7-33) or (7-34), in mixing ratios of 5 to 25% of the first component, 15 to 50% of the second component, 25 to 75% of the third component, and 35% or less of the fourth component.

(iv) A liquid crystal composition wherein, in the above composition (iii), the respective mixing ratios of the first component, the second component, the third component and the fourth component, are 5 to 15%, 15 to 42%, 30 to 54% and 10 to 35% based upon the total weight of the composition.

EXAMPLE

The present invention will be described in detail by way of Comparative examples and Examples, but the present invention should not be construed to be limited thereto. Further, the compositions in Comparative examples and Examples are all shown in terms of % by weight. In addition, the compounds used in Examples and Comparative examples have been expressed by symbols, based upon the designation methods defined in Table 1.

TABLE 1

| Designation methods of compounds by way of symbols $R-(A_1)-Z_1- \ldots -Z_n-(A_n)-X$ | |
|---|---|
| 1) Left terminal group $R-$ | Symbol |
| $C_nH_{2n+1}-$ | n- |
| $C_nH_{2n+1}O-$ | nO- |
| $C_nH_{2n+1}OC_mH_{2m}-$ | nOm- |
| $CH_2=CHC_nH_{2n}-$ | Vn- |
| $C_nH_{2n+1}CH=CHC_mH_{2m}-$ | nVm- |
| $C_nH_{2n+1}CH=CHC_mH_{2m}CH=CHC_kH_{2k}-$ | nVmVk- |
| 2) Ring structure $-(A_1)-, -(A_n)-$ | Symbol |
|  | B |
| 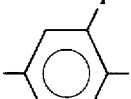 | B(F) |
| 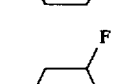 | B(F,F) |
| 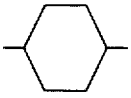 | H |
| 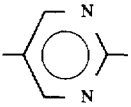 | Py |
| 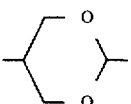 | D |

TABLE 1-continued

| Designation methods of compounds by way of symbols $R-(A_1)-Z_1- \ldots -Z_n-(A_n)-X$ | |
|---|---|
| 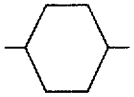 | Ch |
| 3) Binding group $-Z_1, -Z_n-$ | Symbol |
| $-CH_2CH_2-$ | 2 |
| $-COO-$ | E |
| $-C\equiv C-$ | T |
| $-CH=CH-$ | V |
| $-CF_2O-$ | CF2O |
| $-OCF_2-$ | OCF2 |
| 4) Right terminal group $-X$ | Symbol |
| $-F$ | $-F$ |
| $-Cl$ | $-CL$ |
| $-CN$ | $-C$ |
| $-CF_3$ | $-CF3$ |
| $-OCF_3$ | $-OCF3$ |
| $-OCF_2H$ | $-OCF2H$ |
| $-C_nH_{2n+1}$ | -n |
| $-OC_nH_{2n+1}$ | -On |
| $-COOCH_3$ | -EMe |
| $-C_nH_{2n}CH=CH_2$ | -nV |
| $-C_mH_{2m}CH=CHC_nH_{2n+1}$ | -mVn |

5) Designation example

Example 1 3-H2B(F,F)B(F)-F

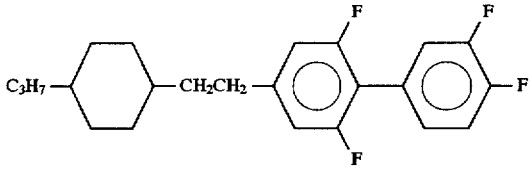

Example 2 3-HB(F)TB-2

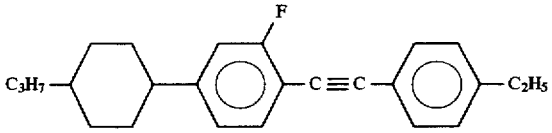

Example 3 1V2-BEB(F,F)-C

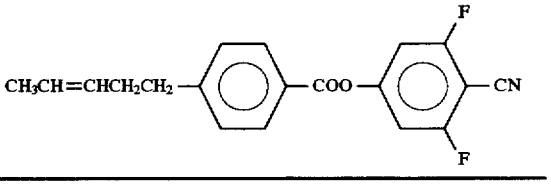

The characteristic values of the liquid crystal composition are respectively abbreviated by the symbols in the following parentheses. The abbreviations are as follows:

Clearing point: ($T_{NI}$), nematic phase lower limit temperature: ($T_{NL}$), viscosity at 20° C.: ($\eta 20$), optical anisotropy at 25° C.: ($\Delta n$), dielectric anisotropy at 25° C.: ($\Delta \epsilon$), and threshold voltage at 25° C.: ($V_{th}$).

In addition, the measurement of $T_{NL}$ was carried out by preserving the sample in the respective freezers kept at 0° C., −10° C., −20° C. and −30° C., for 30 days, followed by observing the resulting samples. The temperature of the freezer at which the solid phase (crystalline phase) appeared was shown in terms of the approximate value of $T_{NL}$. Namely, expression of the value was made by omitting a value on the lower limit side within the temperature range in which the solidifying point is included. For example, in the case where no solid phase is present in the freezer at $-10°$ C., but solid phase appears in the freezer at $-20°$ C., then the expression is $-10°$ C.$>T_{NL}>-20°$ C., but the abbreviation value of $T_{NL}$ was denoted as $<-10°$ C. Further, in the case where appearance of solid phase was not observed, the abbreviation value of $T_{NL}$ was denoted as $T_{NL}<-30°$ C.

COMPARATIVE EXAMPLE 1

The following composition disclosed in Use example 1 of Japanese patent application laid-open No. Hei 1-305040 was prepared:

| | |
|---|---|
| 4-BTBB-4 | 5.0% |
| 3-HB-C | 28.5% |
| 5-HB-C | 38.0% |
| 7-HB-C | 28.5% |

Characteristic values were as follows:

$T_{NI}=57.2°$ C.
$T_{NL}<0°$ C.
$\eta 20=22.5$ mPa·s
$\Delta n=0.131$
$\Delta \square =10.1$
$V_{th}=1.58V$

COMPARATIVE EXAMPLE 2

The following composition disclosed in Japanese patent application laid-open No. Hei 6-316541, as liquid crystal composition a, was prepared:

| | |
|---|---|
| 5-BTB(F)TB-5 | 10.0% |
| 2-BEB-C | 12.0% |
| 4-BEB-C | 12.0% |
| 3-HEB-O2 | 6.6% |
| 3-HEB-O4 | 17.4% |
| 4-HEB-O1 | 13.5% |
| 4-HEB-O2 | 13.6% |
| 5-HEB-O1 | 14.9% |

The characteristic values of this composition were as follows:

$T_{NI}=69.1°$ C.
$T_{NL}<0°$ C.
$\eta 20=33.4$ mPa·s
$\Delta n=0.134$
$\Delta \epsilon=6.2$
$V_{th}=1.65V$

EXAMPLE 1

The following composition was prepared.

| | |
|---|---|
| 5-BTB(F)TB-5 | 5.0% |
| 3-HB-C | 20.0% |
| 5-HB-C | 6.0% |
| 2-BB-C | 5.0% |

-continued

| | |
|---|---|
| 2-BTB-O1 | 5.0% |
| 3-BTB-O1 | 5.0% |
| 4-BTB-O1 | 5.0% |
| 4-BTB-O2 | 5.0% |
| 5-BTB-O1 | 5.0% |
| 3-HHB-1 | 8.0% |
| 3-HHB-3 | 7.0% |
| 3-H2BTB-2 | 4.0% |
| 3-H2BTB-3 | 4.0% |
| 3-HB(F)TB-2 | 8.0% |
| 3-HB(F)TB-3 | 8.0% |

The characteristic values of this composition were as follows:

$T_{NI}=98.6°$ C.
$T_{NL}<-30°$ C.
$\eta 20=20.6$ mPa·s
$\Delta n=0.206$
$\Delta \epsilon=5.7$
$V_{th}=2.20V$ This liquid crystal composition exhibited a low temperature compatibility, a broad nematic phase range, a large $\Delta n$, and a low viscosity, as compared with liquid crystal compositions described in Comparative examples 1 and 2.

EXAMPLE 2

The following composition was prepared:

| | |
|---|---|
| 5-BTB(F)TB-3 | 10.0% |
| 1V2-BEB(F,F)-C | 5.0% |
| 3-HB-C | 25.0% |
| 2-BTB-1 | 11.0% |
| 3-BTB-1 | 5.0% |
| V2-HH-3 | 8.0% |
| V-HH-4 | 6.0% |
| 3-HHB-1 | 10.0% |
| 3-HHB-3 | 9.0% |
| 3-H2BTB-2 | 4.0% |
| 3-H2BTB-3 | 4.0% |
| 3-H2BTB-4 | 3.0% |

The characteristic values of this composition were as follows:

$T_{NI}=86.1°$ C.
$T_{NL}<-30°$ C.
$\eta 20=13.5$ mPa·s
$\Delta n=0.173$
$\Delta \epsilon=6.7$
$V_{th}=2.08V$

EXAMPLE 3

The following composition was prepared:

| | |
|---|---|
| 5-BTB(F)TB-3 | 12.0% |
| 5-BTB(F)TB-5 | 8.0% |
| V2-HB-C | 12.0% |
| 3-HB-C | 16.0% |
| 5-HB-C | 5.0% |
| 1O1-HB-C | 3.0% |
| 2-HHB-C | 3.0% |
| 3-HHB-C | 3.0% |
| 4-HHB-C | 3.0% |
| 1O1-HH-5 | 4.0% |
| 2-BTB-O1 | 7.0% |

-continued

| | |
|---|---|
| 3-HH-4 | 10.0% |
| 3-HB(F)VB-2 | 4.0% |
| 3-HB(F)VB-3 | 4.0% |
| 3-HHB-1 | 6.0% |

The characteristic values of this composition were as follows:

$T_{NI}=141.4°$ C.
$T_{NL}<-20°$ C.
$\eta 20=25.6$ mPa·s
$\Delta n=0.200$
$\Delta\epsilon=6.4$
$V_{th}=2.64V$

EXAMPLE 4

The following composition was prepared:

| | |
|---|---|
| 5-BTB(F)TB-3 | 10.0% |
| 3-HB-C | 30.0% |
| 5-HB-C | 10.0% |
| 2-BTB-1 | 10.0% |
| 3-HH-4 | 10.0% |
| 3-HHB-1 | 10.0% |
| 3-HHB-3 | 11.0% |
| 3-H2BTB-2 | 4.0% |
| 3-H2BTB-3 | 3.0% |
| 3-H2BTB-4 | 2.0% |

The characteristic values of this composition were as follows:

$T_{NI}=90.0°$ C.
$T_{SN}<-30°$ C.
$\eta 20=14.0$ mPa·s
$\Delta n=0.163$
$V_{th}=2.20V$

EXAMPLE 5

The following composition was prepared:

| | |
|---|---|
| 5-BTBTB-3 | 3.0% |
| 5-BTB(F)TB-2 | 3.0% |
| 5-BTB(F)TB-3 | 5.0% |
| 3-HB-C | 10.0% |
| 5-HB-C | 5.0% |
| 3-HHEBB-C | 2.0% |
| 3-HBEBB-C | 2.0% |
| 3-HB-O2 | 10.0% |
| 2-PyB-2 | 8.3% |
| 3-PyB-2 | 8.3% |
| 4-PyB-2 | 8.4% |
| 2-PyB-O2 | 3.0% |
| 3-HHB-3 | 4.0% |
| 3-HHB-1 | 5.0% |
| 3-PyBH-2 | 7.0% |
| 2-PyBH-3 | 7.0% |
| 4-PyBB-2 | 5.0% |
| 6-PyBB-2 | 4.0% |

The characteristic values of this composition were as follows:

$T_{NI}=87.3°$ C.
$T_{NL}<-10°$ C.
$\eta 20=25.1$ mPa·s
$\Delta n=0.198$
$\Delta\epsilon=0.198$
$V_{th}=2.11V$

EXAMPLE 6

The following composition was prepared:

| | |
|---|---|
| 5-BTBTB-2 | 3.0% |
| 5-BTBTB-3 | 4.0% |
| 3-HB-C | 16.0% |
| 5-HB-C | 12.0% |
| V2-HB-C | 12.0% |
| 1V2-HB-C | 10.0% |
| 3-HB-O2 | 7.0% |
| 2-BTB-O1 | 2.6% |
| 3-BTB-O1 | 2.6% |
| 4-BTB-O1 | 2.6% |
| 4-BTB-O2 | 2.6% |
| 5-BTB-O1 | 2.6% |
| 3-HH-4 | 7.0% |
| 3-HB(F)TB-2 | 8.0% |
| 3-HB(F)TB-3 | 6.0% |
| 3-HEBEB-1 | 2.0% |

The characteristic values of this composition were as follows:

$T_{NI}=77.9°$ C.
$T_{NL}<-10°$ C.
$\eta 20=18.0$ mPa·s
$\Delta n=0.172$
$\Delta\epsilon=7.4$
$V_{th}=1.87V$

EXAMPLE 7

The following composition was prepared:

| | |
|---|---|
| 5-BTB(F)TB-3 | 10.0% |
| 301-BEB(F)-C | 12.0% |
| 1V2-HB-C | 7.0% |
| 2-BTB-O1 | 2.8% |
| 3-BTB-O1 | 2.8% |
| 4-BTB-O1 | 2.8% |
| 4-BTB-O2 | 2.8% |
| 5-BTB-O1 | 2.8% |
| 2-BTB-1 | 10.0% |
| 2-BTB-3 | 9.0% |
| 3-HH-4 | 4.0% |
| 3-H2BTB-2 | 4.0% |
| 3-H2BTB-3 | 4.0% |
| 3-H2BTB-4 | 4.0% |
| 2-H2BTB-4 | 4.0% |
| 3-HB(F)TB-2 | 5.0% |
| 3-HB(F)TB-3 | 8.0% |
| 3-HB(F)TB-4 | 5.0% |

The characteristic values of this composition were as follows:

$T_{NI}=90.1°$ C.
$T_{NL}<-30°$ C.
$\eta 20=21.8$ mPa·s
$\Delta n=0.239$
$\Delta\epsilon=5.0$
$V_{th}=2.11V$

EXAMPLE 8

The following composition was prepared:

| | |
|---|---|
| 5-BTB(F)TB-3 | 10.0% |
| 3O1-BEB(F)-C | 8.0% |
| V2-HB-C | 5.0% |
| 3-HB-C | 6.0% |
| 2-BTB-O1 | 2.8% |
| 3-BTB-O1 | 2.8% |
| 4-BTB-O1 | 2.8% |
| 4-BTB-O2 | 2.8% |
| 5-BTB-O1 | 2.8% |
| 2-BTB-1 | 10.0% |
| 2-BTB-3 | 10.0% |
| V2-HH-3 | 6.0% |
| 3-H2BTB-2 | 6.0% |
| 3-H2BTB-3 | 6.0% |
| 3-H2BTB-4 | 6.0% |
| 3-HB(F)TB-2 | 5.0% |
| 3-HB(F)TB-3 | 4.0% |
| 3-HB(F)TB-4 | 4.0% |

The characteristic values of this composition were as follows:

$T_{NI}$=87.3° C.

$T_{SN}$<-30° C.

$\eta 20$=19.7 mPa·s $\Delta n$=0.233

$\Delta \epsilon$=4.8

$V_{th}$=2.18V

EXAMPLE 9

The following composition was prepared:

| | |
|---|---|
| 5-BTB(F)TB-5 | 5.0% |
| 5-BTB(F)TB-3 | 10.0% |
| 2O1-BEB (F)-C | 10.0% |
| 2O1-HBEB(F)-C | 3.0% |
| 5-HB(F)EB(F)-C | 3.0% |
| 3-HB(F)-C | 8.0% |
| 3-HHB(F)-C | 7.0% |
| 1O1-HH-3 | 9.0% |
| 3-HH-4 | 10.0% |
| 3-HH-5 | 5.0% |
| 3-HB-O2 | 15.0% |
| 3-HHB-1 | 10.0% |
| 3-HHB-3 | 5.0% |

The characteristic values of this composition were as follows:

$T_{NI}$=94.0° C.

$T_{NL}$<-20° C.

$\eta 20$=19.3 mPa·s $\Delta n$=0.143

$\Delta \epsilon$=9.5

$V_{th}$=1.74V

EXAMPLE 10

The following composition was prepared:

| | |
|---|---|
| 5-BTB(F)TB-3 | 12.0% |
| 1V2-BEB(F,F)-C | 5.0% |
| 3-HBEB(F,F)-C | 2.0% |
| 3-HB-C | 23.0% |
| 2-BTB-1 | 11.0% |
| 3-HH-4 | 11.0% |
| 3-HH-5 | 5.0% |
| 2-HH-5 | 3.0% |
| 3-HHB-1 | 10.0% |
| 3-HHB-3 | 8.0% |
| 3-H2BTB-3 | 4.0% |
| 3-H2BTB-4 | 4.0% |
| 1O1-HBBH-3 | 2.0% |

The characteristic values of this composition were as follows:

$T_{NI}$=95.0° C.

$T_{NL}$<-30° C.

$\eta 20$=15.0 mPa·s $\Delta n$=0.169

$\Delta \epsilon$=7.3

$V_{th}$=2.08V

EXAMPLE 11

The following composition was prepared:

| | |
|---|---|
| 5-BTB(F)TB-3 | 5.0% |
| 3-HB-C | 14.0% |
| 2-BB-C | 8.0% |
| 4-BB-C | 6.0% |
| 3-HHB-C | 4.0% |
| 2-PyB-2 | 3.3% |
| 3-PyB-2 | 3.3% |
| 4-PyB-2 | 3.4% |
| 3-HH-4 | 10.0% |
| 3-HB-O2 | 10.0% |
| 2-BTB-O1 | 10.0% |
| 3-HHB-1 | 6.0% |
| 3-H2BTB-2 | 4.0% |
| 3-H2BTB-3 | 3.0% |
| 3-PyBB-F | 5.0% |
| 5-PyBB-F | 3.0% |
| 5-PyB-F | 2.0% |

The characteristic values of this composition were as follows:

$T_{NI}$=69.5° C.

$T_{NL}$<-30° C.

$\eta 20$=17.2 mPa·s $\Delta n$=0.172

$\Delta \epsilon$=7.0

$V_{th}$=2.27V

EXAMPLE 12

The following composition was prepared:

| | |
|---|---|
| 5-BTB(F)TB-3 | 7.0% |
| 3-HB-C | 7.0% |
| 1V2-HB-C | 8.0% |
| 3-HB(F)-C | 15.0% |
| 2-HHB-C | 6.0% |
| 3-HHB-C | 6.0% |
| 3-HHB-1 | 10.0% |
| 3-HHB-3 | 6.0% |
| 3-H2BTB-2 | 6.0% |
| 3-H2BTB-3 | 4.0% |
| 3-H2BTB-4 | 4.0% |
| 5-PyB(F)-F | 8.0% |

| | |
|---|---|
| 5-PyB-F | 6.0% |
| 3-HBB-F | 4.0% |
| 3-HHB-F | 3.0% |

The characteristic values of this composition were as follows:

$T_{NI}$=99.2° C.
$T_{NL}$<−30° C.
η20=23.0 mPa·s
Δn=0.160
Δε=9.9
$V_{th}$=1.91V

EXAMPLE 13

The following composition was prepared:

| | |
|---|---|
| 5-BTB(F)TB-2 | 8.0% |
| 5-BTB(F)TB-3 | 4.0% |
| 5-BTBTB-3 | 3.0% |
| 2-BB-C | 5.0% |
| 1O1-HB-C | 5.0% |
| 2-BEB-C | 5.0% |
| 3-DB-C | 5.0% |
| 3-HB-C | 10.0% |
| 2-PyB-2 | 5.0% |
| 3-PyB-2 | 5.0% |
| 4-PyB-2 | 5.0% |
| 3-HH-4 | 5.0% |
| 3-HH-5 | 5.0% |
| 2-PyBH-3 | 5.0% |
| 3-HHB-1 | 5.0% |
| 3-HHB-O1 | 5.0% |
| 2-HHB(F)-F | 3.7% |
| 3-HHB(F)-F | 3.7% |
| 4-HHB(F)-F | 3.7% |
| 7-HB(F)-F | 2.0% |
| 5-H2B(F)-F | 2.0% |

The characteristic values of this composition were as follows:

$T_{NI}$=77.5° C.
$T_{NL}$<−20° C.
η20=19.8 mPa·s
Δn=0.164
Δε=7.6
$V_{th}$=1.74V

EXAMPLE 14

The following composition was prepared:

| | |
|---|---|
| 5-BTB(F)TB-3 | 10.0% |
| 3-HB-C | 10.0% |
| 4-HB-C | 3.0% |
| 5-HBB-C | 2.0% |
| 2-BTB-1 | 10.0% |
| 2-BTB-3 | 10.0% |
| 3-HH-4 | 10.0% |
| 3-HB-O2 | 10.0% |
| 2-H2HB(F)-F | 2.0% |
| 3-H2HB(F)-F | 1.0% |
| 5-H2HB(F)-F | 2.5% |
| 2-HBB(F)-F | 2.5% |
| 3-HBB(F)-F | 2.0% |
| 4-HBB(F)-F | 5.0% |
| 3-HBB(F,F)-F | 5.0% |

| | |
|---|---|
| 3-H2BB(F,F)-F | 5.0% |
| 3-HB-CL | 5.0% |
| 3-HHB-CL | 5.0% |

The characteristic values of this composition were as follows:

$T_{NI}$=68.1° C.
$T_{NL}$<−10° C.
η20=16.1 mPa·s
Δn=0.162
Δε=4.3
$V_{th}$=2.13V

EXAMPLE 15

The following composition was prepared:

| | |
|---|---|
| 3-BTB(F)TB-5 | 5.0% |
| 5-BTB(F)TB-2 | 5.0% |
| 2-HB-C | 6.0% |
| 3-HB-C | 11.0% |
| 2-BTB-1 | 12.0% |
| 1-BTB-3 | 10.0% |
| 2-BTB-3 | 3.0% |
| 3-HH-4 | 7.0% |
| 3-HB(F)TB-2 | 4.0% |
| 3-HB(F)TB-3 | 4.0% |
| 3-HB(F)TB-4 | 3.0% |
| 3-H2BTB-2 | 3.0% |
| 3-H2BTB-3 | 3.0% |
| 3-H2BTB-4 | 3.0% |
| 2-PyBB-F | 7.0% |
| 3-PyBB-F | 7.0% |
| 4-PyBB-F | 7.0% |

The characteristic values of this composition were as follows:

$T_{NI}$=94.8° C.
$T_{NL}$<−10° C.
η20=19.4 mPa·s
Δn=0.236
Δε=6.2
$V_{th}$=2.15V

EXAMPLE 16

The following composition was prepared:

| | |
|---|---|
| 5-BTB(F)TB-2 | 6.0% |
| 5-BTB(F)TB-4 | 6.0% |
| V-HB-C | 15.0% |
| 1V-HB-C | 15.0% |
| 2-BTB-1 | 11.0% |
| V2-HH-3 | 11.0% |
| V-HH-4 | 6.0% |
| V-HHB-1 | 10.0% |
| 1V2-HBB-2 | 8.0% |
| 3-H2BTB-2 | 4.0% |
| 3-H2BTB-3 | 4.0% |
| 3-H2BTB-4 | 4.0% |

The characteristic values of this composition were as follows:

$T_{NI}$=92.2° C.
$T_{NL}$<−30° C.
η20=13.4 mPa·s

Δn=0.181
Δε=5.1
$V_{th}$=2.42V

EXAMPLE 17

The following composition was prepared:

| | |
|---|---|
| 5-BTB(F)TB-2 | 5.0% |
| 3-BTB(F)TB-5 | 5.0% |
| 3-HB-C | 20.0% |
| 5-HB-C | 5.0% |
| 2-BTB-1 | 10.0% |
| 3-BTB-1 | 5.0% |
| 3-HH-4 | 10.0% |
| 3-HH-5 | 4.0% |
| 3-HHB-1 | 10.0% |
| 3-H2BTB-2 | 5.0% |
| 3-H2BTB-3 | 5.0% |
| 3-H2BTB-4 | 5.0% |
| 3-HHEB-F | 3.0% |
| 3-HBEB-F | 3.0% |
| 3-HH2B(F,F)-F | 5.0% |

The characteristic values of this composition were as follows:
$T_{NI}$=94.8° C.
$T_{NL}$<-30° C.
η20=14.2 mPa·s
Δn=0.175
Δε=5.0
$V_{th}$=2.57V

EXAMPLE 18

The following composition was prepared:

| | |
|---|---|
| 5-BTB(F)TB-1 | 8.0% |
| 5-BTB(F)TB-3 | 8.0% |
| V2-HB-C | 5.0% |
| 1V2-HB-C | 10.0% |
| 201-BEB(F)-C | 7.0% |
| 3-HB-C | 17.0% |
| 2-BTB-O1 | 5.6% |
| 3-BTB-O1 | 5.6% |
| 4-BTB-O1 | 5.6% |
| 4-BTB-O2 | 5.0% |
| 5-BTB-O1 | 5.6% |
| 3-H2BTB-2 | 4.0% |
| 3-H2BTB-3 | 4.0% |
| 3-H2BTB-4 | 4.0% |
| 2-H2BTB-2 | 5.0% |

The characteristic values of this composition were as follows:
$T_{NI}$=87.5° C.
$T_{NL}$<-30° C.
η20=25.0 mPa·s
Δn=0.230
Δε=8.5
$V_{th}$=1.83V

EXAMPLE 19

The following composition was prepared:

| | |
|---|---|
| 5-BTB(F)TB-3 | 10.0% |
| 301-BEB(F)-C | 12.0% |
| 1V2-HB-C | 7.0% |
| 2-BTB-O1 | 8.2% |
| 3-BTB-O1 | 8.2% |
| 4-BTB-O1 | 8.2% |
| 4-BTB-O2 | 8.2% |
| 5-BTB-O1 | 8.2% |
| 3-H2BTB-2 | 5.0% |
| 3-H2BTB-3 | 4.0% |
| 3-H2BTB-4 | 4.0% |
| 3-HB(F)TB-2 | 5.0% |
| 3-HB(F)TB-3 | 6.0% |
| 3-HB(F)TB-4 | 6.0% |

The characteristic values of this composition were as follows:
$T_{NI}$=97.4° C.
$T_{NL}$<-30° C.
η20=28.1 mPa·s
Δn=0.260
Δ☐=6.5
$V_{th}$=2.17V

EXAMPLE 20

The following composition was prepared:

| | |
|---|---|
| 5-BTB(F)TB-2 | 7.0% |
| 5-BTB(F)TB-3 | 7.0% |
| 3-BTB(F)TB-5 | 7.0% |
| V2-HB-C | 12.0% |
| 1V2-HB-C | 12.0% |
| 2-BTB-1 | 9.0% |
| 3-BTB-1 | 8.0% |
| 2-BTB-3 | 8.0% |
| 3-HH-4 | 11.0% |
| 3-HH-5 | 5.0% |
| 2-HH-5 | 6.0% |
| 3-H2BTB-2 | 4.0% |
| 3-H2BTB-3 | 4.0% |

The characteristic values of this composition were as follows:
$T_{NI}$=80.5° C.
$T_{NL}$<-20° C.
η20=13.8 mPa·s
Δn=0.211
Δε=3.9
$V_{th}$=2.47V FIG. 1 illustrates the correlation between the clearing point and the viscosity of the liquid crystal compositions shown in Examples and Comparative examples. In general, the liquid crystal material has a tendency that the higher the clearing point, the higher the viscosity. However, as apparent from FIG. 1, the composition of the present invention has a characteristic that it has a higher clearing point and a lower viscosity than those of Comparative examples.

As described above, the present invention provides a liquid crystal composition which satisfies various characteristics required for TN-LCD and STN-LCD display modes, and at the same time, exhibits particularly a high optical anisotropy, and a superior low temperature compatibility, a broad nematic phase temperature and a low viscosity.

What is claimed is:

1. A liquid crystal composition comprising as a first component, at least one member selected from the group consisting of compounds expressed by the formula (1)

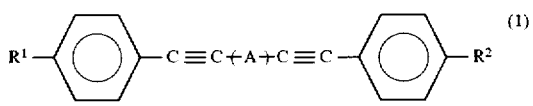

wherein $R^1$ and $R^2$ each independently represent an alkyl group of 1 to 10 carbon atoms or an alkenyl group of 2 to 10 carbon atoms, and in any of the groups, optional one or two not-adjacent methylene groups may be replaced by oxygen atom; and A represents 1,4-phenylene whose one H on lateral positions thereof may be replaced by F;

as a second component, at least one member selected from the group consisting of compounds expressed by the formulas (2-a), (2-b), (2-c), (2-d) and (2-e):

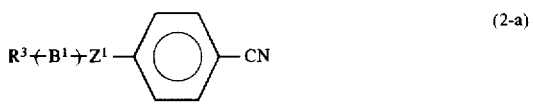

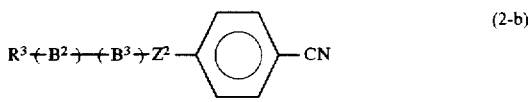

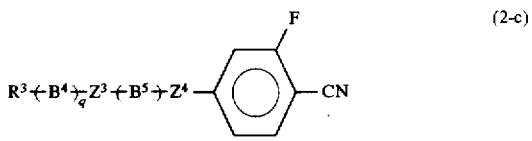

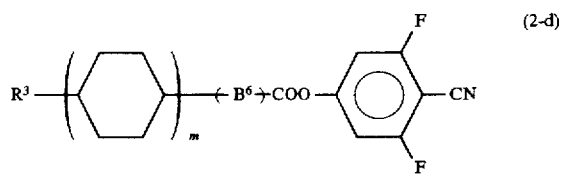

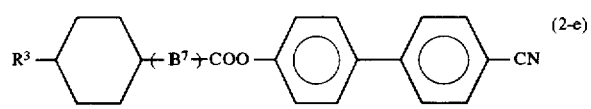

wherein $R^3$ represents an alkyl group of 1 to 10 carbon atoms or an alkenyl group of 2 to 10 carbon atoms, and in any of the groups, optional one or two not-adjacent methylene groups may be replaced by oxygen atom; $Z^1$ and $Z^4$ each independently represent —COO—, —C$_2$H$_4$— or a single bond; $Z^2$ and $Z^3$ each independently represent —C$_2$H$_4$— or a single bond; $B^1$ represents trans-1,4-cyclohexylene, 1,4-phenylene or 1,3-dioxane-trans-2,5-diyl; $B^2$, $B^3$, $B^4$, $B^6$ and $B^1$ each independently represent trans-1,4-cyclohexylene or 1,4-phenylene; $B^5$ represents trans-1,4-cyclohexylene or 1,4-phenylene wherein one H on lateral positions thereof may be replaced by F; and q and m each independently represent 0 or 1;

and as a third component, at least one member selected from the group consisting of compounds expressed by the formulas (3), (4) and (5):

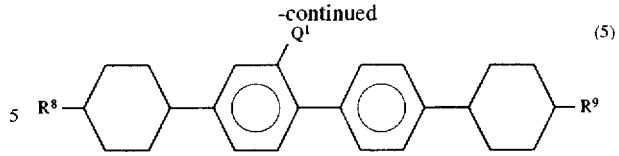

wherein $R^4$, $R^5$, $R^6$ and $R^8$ each independently represent an alkyl group of 1 to 10 carbon atoms or an alkenyl group of 2 to 10 carbon atoms, and in any of the groups, optional one or two not-adjacent methylene groups may be replaced by oxygen atom; $R^7$ and $R^9$ each independently represent an alkyl group, an alkoxy group or an alkoxymethyl group, each of 1 to 10 carbon atoms; C represents trans-1,4-cyclohexylene, pyrimidine-2,5-diyl or 1,4-phenylene; D and J each represent trans-1,4-cyclohexylene or 1,4-phenylene; E represents trans-1,4-cyclohexylene or pyrimidine-2,5-diyl; G represents trans-1,4-cyclohexylene or 1,4-phenylene wherein one H on lateral positions thereof may be replaced by F; $Z^5$ represents —C≡C—, —C$_2$H$_4$—, —CH=CH— or a single bond; $Z^6$ represents —C$_2$H$_4$—, —COO— or a single bond; $Z^7$ represents —C≡C—, —COO—, —CH=CH— or a single bond; and $Q^1$ represents H or F.

2. A liquid crystal composition according to claim 1, wherein the mixing ratios of the first component, the second component and the third component are respectively 3 to 30%, 10 to 60% and 20 to 80%, each based upon the total weight of the liquid crystal composition.

3. A liquid crystal composition according to claim 1 or 2, further comprising as a fourth component, at least one member selected from the group consisting of compounds expressed by the formulas (6) and (7):

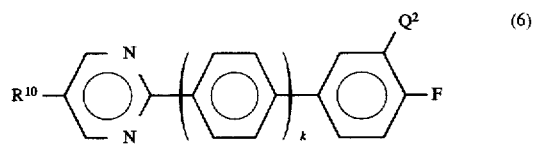

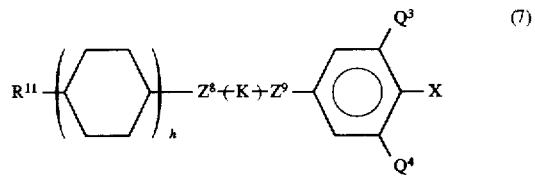

wherein $R^{10}$ and $R^{11}$ each independently represent an alkyl group of 1 to 10 carbon atoms; K represents trans-1,4-cyclohexylene or 1,4-phenylene; $Z^8$ and $Z^9$ each independently represent —COO—, —C$_2$H$_4$— or a single bond; X represents F or Cl; $Q^2$, $Q^3$ and $Q^4$ each independently represent H or F; k represents 0 or 1; and h represents 0, 1 or 2.

4. A liquid crystal composition according to claim 3, wherein the mixing ratio of the fourth component is 40% or less based upon the total weight of the liquid crystal composition.

5. A liquid crystal display element comprising, as a liquid crystal material, a liquid crystal composition which comprises as a first component, at least one member selected from the group consisting of compounds expressed by the formula (1)

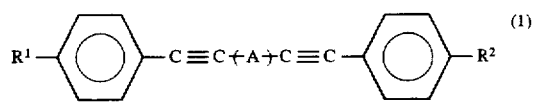

wherein $R^1$ and $R^2$ each independently represent an alkyl group of 1 to 10 carbon atoms or an alkenyl group of 2 to 10 carbon atoms, and in any of the groups, optional one or two not-adjacent methylene groups may be replaced by oxygen atom; and A represents 1,4-phenylene whose one H on lateral positions thereof may be replaced by F;

as a second component, at least one member selected from the group consisting of compounds expressed by the formulas (2-a), (2-b), (2-c), (2-d) and (2-e):

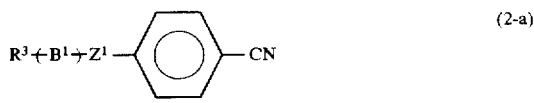
(2-a)

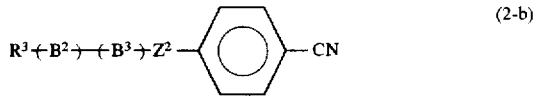
(2-b)

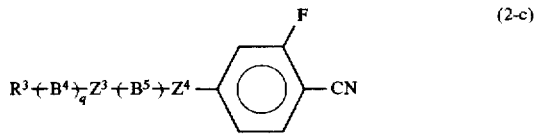
(2-c)

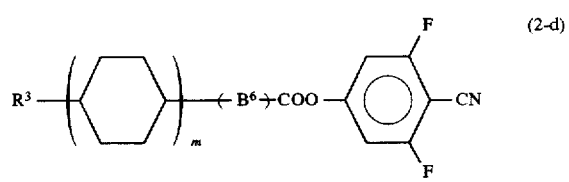
(2-d)

(2-e)

wherein $R^3$ represents an alkyl group of 1 to 10 carbon atoms or an alkenyl group of 2 to 10 carbon atoms, and in any of the groups, optional one or two not-adjacent methylene groups may be replaced by oxygen atom; $Z^1$ and $Z^4$ each independently represent —COO—, —C$_2$H$_4$— or a single bond; $Z^2$ and $Z^3$ each independently represent —C$_2$H$_4$— or a single bond; $B^1$ represents trans-1,4-cyclohexylene, 1,4-phenylene or 1,3-dioxane-trans-2,5-diyl; $B^2$, $B^3$, $B^4$, $B^6$ and $B^7$ each independently represent trans-1,4-cyclohexylene or 1,4-phenylene; $B^5$ represents trans-1,4-cyclohexylene or 1,4-phenylene wherein one H on lateral positions thereof may be replaced by F; and q and m each independently represent 0 or 1;

and as a third component, at least one member selected from the group consisting of compounds expressed by the formulas (3), (4) [or] and (5):

R⁴⁺C⁺Z⁵⁺D⁺R⁵                  (3)

R⁶⁺E⁺Z⁶⁺G⁺Z'⁺J⁺R⁷         (4)

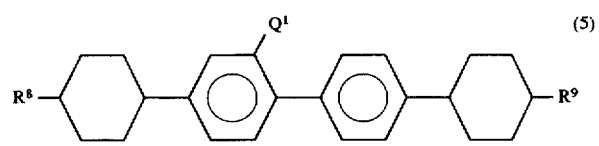
(5)

wherein $R^4$, $R^5$, $R^6$ and $R^8$ each independently represent an alkyl group of 1 to 10 carbon atoms or an alkenyl group of 2 to 10 carbon atoms, and in any of the groups, optional one or two not-adjacent methylene groups may be replaced by oxygen atom; $R^7$ and $R^9$ each independently represent an alkyl group, an alkoxy group or an alkoxymethyl group, each of 1 to 10 carbon atoms; C represents trans-1,4-cyclohexylene, pyrimidine-2,5-diyl or 1,4-phenylene; D and J each represent trans-1,4-cyclohexylene or 1,4-phenylene; E represents trans-1,4-cyclohexylene or pyrimidine-2,5-diyl; G represents trans-1,4-cyclohexylene or 1,4-phenylene wherein one H on lateral positions thereof may be replaced by F; $Z^5$ represents —C≡C—, —C$_2$H$_4$—, —CH=CH— or a single bond; $Z^6$ represents —C$_2$H$_4$—, —COO— or a single bond; $Z^7$ represents —C≡C—, —COO—, —CH=CH— or a single bond; and $Q^1$ represents H or F.

6. A liquid crystal display element according to claim 5, wherein the mixing ratios of the first component, the second component and the third component of the liquid crystal composition are respectively 3 to 30%, 10 to 60% and 20 to 80% based upon the weight of the liquid crystal composition.

7. A liquid crystal display element according to claim 5 or 6, wherein the liquid crystal composition further comprises a fourth component which is at least one member selected from the group consisting of compounds expressed by the formulas (6) and (7):

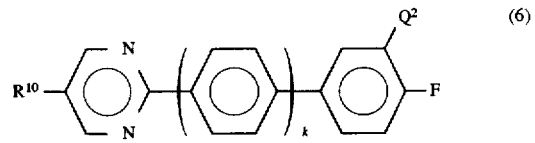
(6)

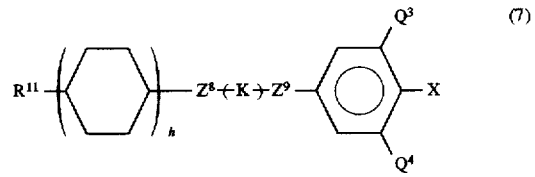
(7)

wherein $R^{10}$ and $R^{11}$ each independently represent an alkyl group of 1 to 10 carbon atoms; K represents trans-1,4-cyclohexylene or 1,4-phenylene; $Z^8$ and $Z^9$ each independently represent —COO—, —C$_2$H$_4$— or a single bond; X represents F or Cl; $Q^2$, $Q^3$ and $Q^4$ each independently represent H or F; k represents 0 or 1; and h represents 0, 1 or 2.

8. A liquid crystal display element according to claim 7, wherein, in the liquid crystal composition, the mixing ratio of the fourth component is 40% or less, based upon the total weight of the liquid crystal composition.